Oct. 26, 1943.  E. L. RIETZ  2,332,754
WHEEL
Filed June 16, 1941   2 Sheets-Sheet 1
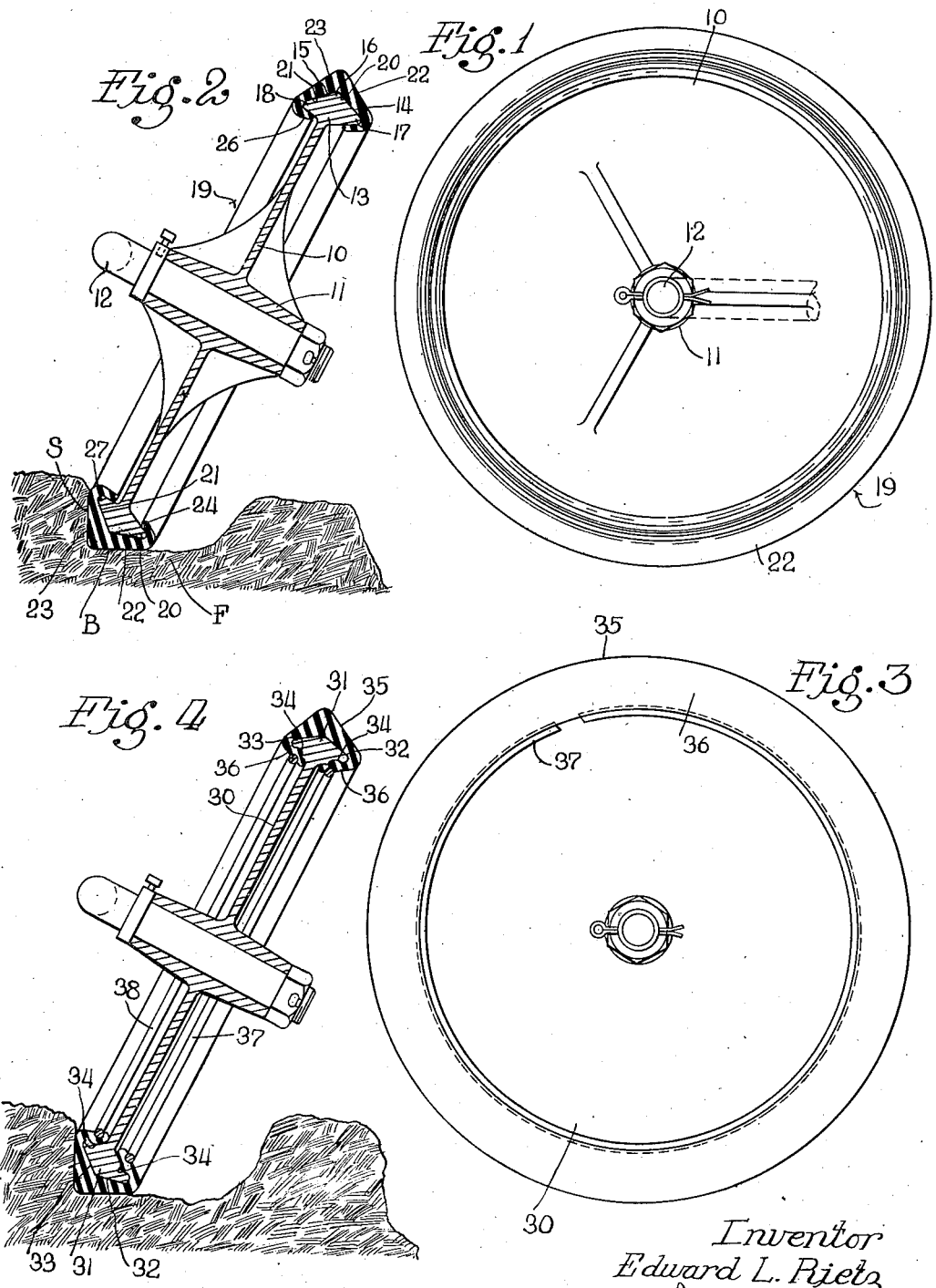
Inventor
Edward L. Rietz
By Paul O Pippel
Atty.

Oct. 26, 1943.  E. L. RIETZ  2,332,754
WHEEL
Filed June 16, 1941  2 Sheets-Sheet 2

Inventor
Edward L. Rietz
By Paul O. Pippel
Atty.

Patented Oct. 26, 1943

2,332,754

UNITED STATES PATENT OFFICE 2,332,754

WHEEL

Edward L. Rietz, Riverside, Ill., assignor to International Harvester Company, a corporation of New Jersey Application June 16, 1941, Serial No. 398,203

2 Claims. (Cl. 152—380)

This invention relates to a wheel, and more particularly to a rubber-tired wheel of the type known as a furrow or pan wheel for a plow.

As is well known to those skilled in the art, the furrow or pan wheel on a plow, or other implement adapted to form a furrow, consists of a wheel which supports the rear end of the plow and which is mounted for rotation on an axis inclined to the horizontal, this axis in most instances being approximately 27 degrees to the horizontal. The function of the ordinary furrow or pan wheel is to follow the furrow and thus to guide the rear end of the plow in the furrow. It is an important function of such a wheel to maintain a uniform working depth of the plow. The wheel cannot function properly in this respect if it does not follow the furrow closely. Among the reasons why furrow wheels do not perform properly is the tendency of a metal-tired wheel to pick up soil from the furrow, which soil gradually accumulates and forms clods or lumps on the wheel rim. These clods when packed on the rim cause the wheel to oscillate and at times to leave the furrow entirely.

The principal object of the present invention is to provide an improved furrow or pan wheel eliminating the difficulties referred to above, this object being accomplished in one specific form of the invention by the provision of a solid rubber tire which is flexible enough to be self-cleaning to the extent that loose particles of soil will not cling to the flexible tread.

An important object of the invention is to provide a rubber-tired wheel having an annular ridge adapted to press into and follow the corner of the furrow.

Another important object is to provide a tire having annular tread surfaces inclined with respect to the rotating axis of the wheel and related to each other at an angle of approximately 90 degrees, whereby there are provided two tread surfaces, one of which rides the bottom of the furrow and the other of which engages the side wall of the furrow.

Another object is to make the tire reversible on the wheel so that when one tread surface becomes worn the tire may be reversed to present the better tread surface under those conditions which exact the most wear from the tire.

And, another object is to provide a tire which is readily movable on and demountable from the wheel.

These and other important and desirable objects of the invention may be more fully understood from the following description taken in conjunction with the accompanying sheets of drawings, in which:

Figure 1 is an elevational view of one form of wheel construction;

Figure 2 is a vertical, sectional view showing the wheel in a furrow;

Figure 3 is an elevational view of a modified form of construction;

Figure 4 is a sectional view of the wheel shown in Figure 3;

Figure 6:
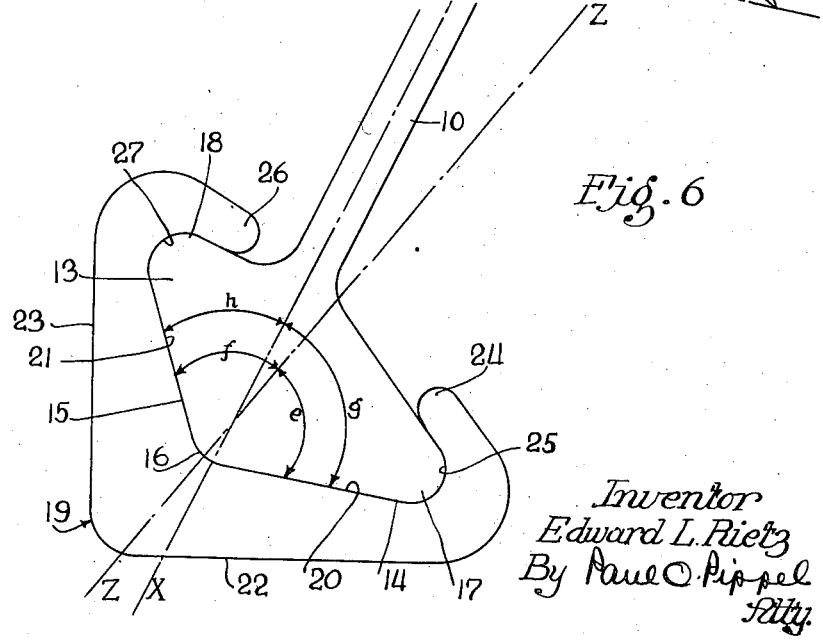

In the wheel construction illustrated in Figures 1 and 2, the wheel is shown as comprising a central wheel body 10 having a hub 11 journaled on an axle 12 forming part of the rear support of a plow or the like, not shown. The rotating axis of the wheel is inclined with respect to the horizontal, the angle of inclination being shown as approximately 27 degrees to the ground line. The wheel body 10 includes an integral rim 13 which is generally triangular in cross-section to provide a pair of outer annular surfaces 14 and 15. Each of these surfaces is inclined axially outwardly and radially inwardly of the median plane of the wheel, the surfaces meeting to provide a peripheral ridge or corner 16 on the rim 13. The particular shape of the rim 13 is shown in Figure 6, wherein the line X—X represents the median plane of the wheel 10. The angle between the surface 15 and the line X—X is represented by the letter $h$, and the angle between the line X—X and the surface 14 is indicated by the letter $g$. It will be seen that the angle $g$ is substantially greater than the angle $h$. According to the particular rim construction illustrated, there is provided at each side of the rim a pair of annular shoulders 17 and 18, these shoulders being formed by an undercutting of the wheel body 10. The diameter of the annular shoulder 17 is slightly greater than the diameter of the shoulder 18.

Figure 5:
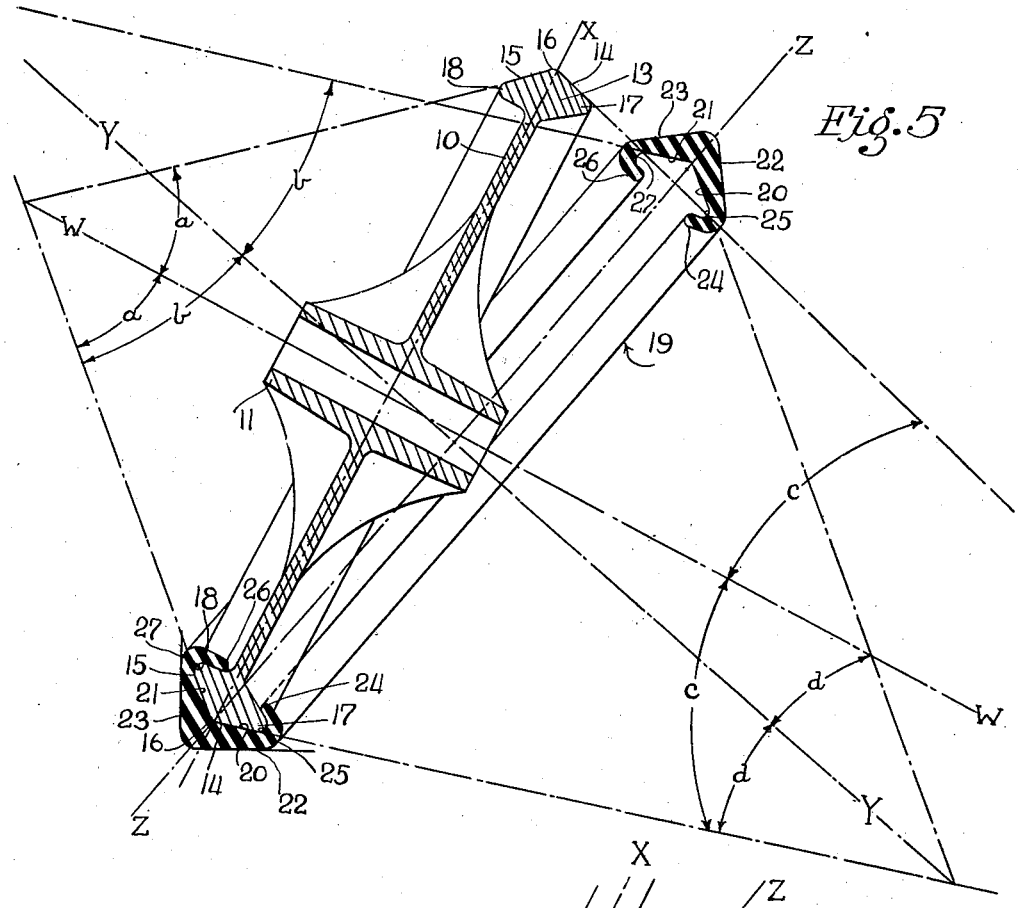
Figure 5 is an enlarged view illustrating the relation between the tire and wheel and the mode of assembling the two; and, Figure 6 is an enlarged, diagrammatic view showing the constructional features of the tire and rim.

A further characteristic of the surfaces 14 and 15 is illustrated in Figure 5, wherein the line W—W represents the rotating axis of the wheel 10. As illustrated in that figure, lines have been extended from the diametrically opposite points on the surfaces 15 to intersect the axis W—W. Each of these lines forms with the axis W—W an angle $a$. It will be seen that the angles $a$ are equal. Lines extended from the surfaces 14 to intersect the axis W—W also form equal angles with that axis, these angles being indicated by the letter *c*. It will be seen that each of the angles *c* is smaller than each of the angles *a*.

According to the present invention the wheel 10 carries a flexible tire, preferably formed of rubber, indicated generally by the reference character 19. As best shown in Figures 2 and 5, the tire comprises an annular tire body formed hollow at its inner periphery and shaped to conform to the rim 13. To this end, the tire is shown as having a first inner annular inclined surface 20 and a second inner inclined surface 21. As shown in Figure 5, opposite sides of the tire 19 are symmetrical as contrasted with opposite sides of the wheel 10, which are asymmetrical. The tire illustrated in Figure 5 is characterized by the equal inclination of the surfaces 20 and 21 with respect to the axis of the tire before the tire is mounted on the wheel. For the purposes of illustration, the tire axis in Figure 5 is indicated as a line Y—Y. Lines extended from the surfaces 20 to intersect the line Y—Y form with that line a pair of equal angles *d*. Lines extended from the surfaces 21 to intersect the line Y—Y form with that line a pair of angles *b*. These latter angles are equal to each other, and to the angles *d*. In Figures 5 and 6, the line Z—Z represents the median plane of the tire 19 before installation of the tire on the rim 13. Another characteristic of the tire is that its surfaces 20 and 21 are bisected by the median plane Z—Z, so that the angle between each surface and the median plane is the same. These angles are represented in Figure 6 by the letters *e* and *f*. It will be apparent from an examination of Figure 6 that the total angle between the surfaces 14 and 15 of the rim 13 is equal to the total angle between the surfaces 20 and 21 of the tire 19. In other words, angle *g* plus angle *h* equals angle *e* plus angle *f*. As has been previously mentioned, these angles are differently related to the median plane of the wheel and to the median plane of the tire before installation of the tire on the rim. The importance of these characteristics will be brought out below.

As shown in Figure 2, the tire 19 is provided with a pair of outer tread surfaces 22 and 23, these surfaces being inclined axially outwardly and radially inwardly from a plane substantially coincident with the median plane of the wheel. As shown in Figure 5, the tread surfaces 22 and 23 form exactly a right angle bisected by the median plane Z—Z of the tire. As shown in Figure 2, the relation between the surfaces 22 and 23 remains the same, but the relation of these surfaces to the median plane of the tire is altered because of the distortion of the tire when the tire is mounted on the rim. According to the present invention this distortion is taken advantage of to aid in keeping the tire on the rim. Adjacent the surface 20 of the tire, the tire is provided with an annular portion 24 which is hook-shaped in cross-section, this annular portion providing inside the tire an annular groove 25. The portion 24 hooks over the inner side of the shoulder 17, the edge of the shoulder fitting into the groove 25. The other side of the tire is similarly provided with an annular portion, indicated at 26, which provides a groove 27 for cooperation with the shoulder 18 of the rim for holding the tire on the rim. In view of the fact that the diameter of the shoulder 18 is slightly less than the diameter of the shoulder 17, the tire, with its annular portions 24 and 26 being equal to each other but greater than the diameter of the shoulder 18 and less than the diameter of the shoulder 17 on the rim 13, is twisted upon being mounted on the rim thus causing both flanges 24 and 26 to be stretched. The body portion of the tire is literally twisted about a circle running through the tire body. The portions 24 and 26 hook over the shoulders 17 and 18 and, together with the resiliency of the tire, combine to provide desirable means for holding the tire on the rim.

Since the tire is formed with its opposite sides symmetrical, it will be clear that the tire can be reversed on the wheel 10. This reversibility enables the tire to be installed on the wheel in alternate positions, thereby providing means for equalizing the wear on the tread surfaces 22 and 23.

As shown in Figure 2, the wheel assembly is adapted to operate in a furrow. A furrow is indicated generally at F and has a bottom surface B, and a side wall S. During operation of the wheel through the furrow, the tread surface 22 of the tire 19 rides the bottom wall B and the tread surface 23 engages the side wall S. The angle between the surfaces 22 and 23 is, as has been previously stated, 90 degrees, which corresponds exactly with the angle between the walls B and S of the furrow. The tread surfaces 22 and 23 intersect to provide a comparatively sharp, peripheral ridge about the tire, which ridge serves to press directly into the corner of the furrow as it takes the side thrust of the plow. As will be seen from the drawings, the tire body 19 is comparatively thicker in a radial direction generally parallelling the median plane of the tire, thus insuring a rigid portion on the tire which is adapted to follow the corner of the furrow. Since the tire is flexible, it is self-cleaning and will not accumulate loose particles of soil in the furrow.

The modified form of construction shown in Figures 3 and 4 is generally similar to that just described, but includes in addition means for clamping the tire to the rim. In Figures 3 and 4 is shown a wheel 30 having a rim 31 provided with opposite shoulders 32 and 33. These shoulders correspond with the shoulders 17 and 18 in the wheel shown in Figure 2, but differ therefrom in that each is provided with an internal annular groove 34. A tire 35, generally similar to the tire 19, is fitted over the rim 31 and has a pair of annular portions 36 respectively fitting the shoulders 32 and extending axially inwardly of the wheel to overlie the grooves 34. A snap-ring 37, formed preferably of spring metal, is disposed within the inner periphery of the portion 36 in radial alinement with the grooves 34. This ring expands and forces part of the portion 36 into the groove 34. A second ring 38, similar to the ring 37, is installed in a like manner at the other side of the wheel. These rings serve as additional means for securing the tire to the wheel.

Although the foregoing description has pertained to a wheel assembly for a plow or the like, it will be appreciated that certain characteristics of the wheel consistent with the invention may be utilized in wheel constructions useful in other circumstances, and it is accordingly not desired to limit the invention to the particular type of wheel and use thereof illustrated. It will be understood further that only preferred forms of the invention have been shown and described and that numerous modifications and alterations may be made therein without departing from the spirit and scope of the invention as defined in the appended claims.

What is claimed is:

1. A rubber-tired wheel assembly comprising a wheel body having opposite faces and an annular rim provided with a pair of angularly related peripheral surfaces, each surface inclining radially inwardly and axially outwardly from the median plane of the wheel body, one surface forming with respect to said median plane an angle greater than the angle between the median plane and the other surface, and a rubber tire carried by the wheel rim, said tire having an annular internal hollow portion provided with a pair of angularly related inner peripheral surfaces equally angled with respect to the median plane of the tire before mounting thereof on the rim and containing between them an angle substantially equal to the total angle between the wheel rim surfaces, said tire being distortable upon mounting thereof on the rim so that the said tire surfaces substantially conform to the aforesaid rim surfaces, and portions on the tire for gripping the wheel to hold the tire on the wheel.

2. A rubber-tired wheel assembly comprising a wheel body having a rim provided with an annular surface inclined to the wheel axis and with a pair of axially spaced, annular shoulders with the surface therebetween, and a flexible tire provided with an annular body including a pair of axially spaced, inner annular grooves adapted respectively to engage the rim shoulders, and an inner annular surface between the grooves and inclined to the tire axis and adapted to engage the rim surface, the angle between the tire axis and the inclined surface of the tire before mounting of the tire on the rim and the angle between the wheel axis and the inclined surface of the tire being unequal, the tire body being distortable upon mounting thereof on the rim to conform to the surfaces and to engage the shoulders with the grooves.

EDWARD L. RIETZ.